United States Patent [19]

Maxwell et al.

[11] Patent Number: 4,514,255

[45] Date of Patent: Apr. 30, 1985

[54] PROCESS FOR THE MANUFACTURE OF DRIED, RESIN-TREATED FIBER FURNISH

[75] Inventors: John W. Maxwell, West Redding, Conn.; Brian Vyse, East Wellow Romsey, England

[73] Assignee: Borden, Inc., Columbus, Ohio

[21] Appl. No.: 524,883

[22] Filed: Aug. 19, 1983

[51] Int. Cl.³ .............................................. D21C 9/00
[52] U.S. Cl. ...................................... 162/9; 156/62.2; 156/62.4; 162/10; 162/24; 162/166; 162/182; 523/330; 524/14
[58] Field of Search .................. 162/9, 10, 12, 13, 17, 162/19, 24–26, 166, 182; 523/330; 524/14; 156/62.2, 62.4

[56] References Cited

U.S. PATENT DOCUMENTS

| | | | |
|---|---|---|---|
| 2,454,534 | 11/1948 | Walter | 162/9 |
| 2,757,148 | 7/1956 | Heritage | 162/10 |
| 2,757,149 | 7/1956 | Heritage | 524/14 |
| 2,757,150 | 7/1956 | Heritage | 524/14 |
| 3,021,244 | 2/1962 | Meiler | 156/62.2 |
| 3,874,990 | 4/1975 | Surdyk | 524/14 |

Primary Examiner—Peter Chin
Attorney, Agent, or Firm—Sidney W. Millard

[57] ABSTRACT

The problem of resin precure encountered in fiberboard, especially medium-density fiberboard, produced by blow-line blending is overcome by adding an alkaline material to the wood fibers prior to blow-line blending in order to raise the pH of the wood preferably into the range of 4 to 7, and optimally around 5.5. Only the fiber used to form the surface layers of the mat which is hot pressed to form the fiberboard need have the alkaline material added thereto; alternatively, especially in the core layer of the mat, the action of the alkaline material may be reversed by adding an acid catalyst. The fiberboards formed have a glossy, hard surface which reduces the need for sanding.

19 Claims, 1 Drawing Figure

PROCESS FOR THE MANUFACTURE OF DRIED, RESIN-TREATED FIBER FURNISH

BACKGROUND OF THE INVENTION

This invention relates to the manufacture of dried, resin-bonded fiber furnish. More particularly, the invention relates to a process for the manufacture of dried, resin-bonded fiber furnish by blow-line blending. The instant fiber furnish is useful for the formation of fiber composites, such as medium density fiberboard and dry process hardboard as well as so-called molded products, and avoids the formation of spots on the surfaces of the composite.

The term "fiber furnish" is used herein to denote masses of fibers derived from wood or similar materials which are useful for consolidation into fiber composites such as fiberboard, particularly medium density fiberboard (having a specific gravity of about 0.7, and dry process hardboard. Fibers which may be used in the instant process include fibers from wood, bagasse, straw, bamboo, sisal and cotton. Mixtures of such materials may of course be used. Preferably, the instant process is practiced with wood fibers.

In a typical process for the manufacture of fiberboard, wood fibers are prepared by heating wood chips in a digester with steam under a pressure of 0.5 to 1 MPa (80-150 lbs./in.$^2$) and to a temperature of 160°-185° C. (320°-365° F.) for 1.5 to 7 minutes. The wood is then fiberized by mechanical attrition at the same temperature and pressure and then dried to the desired moisture content to form a furnish. Before or after the drying, a resin, normally a urea-formaldehyde resin, is added to the fibers and the resultant dry fiber-resin blend is hot pressed to produce the fiberboard.

(The term "urea-formaldehyde" resin is used herein in the somewhat loose sense in which it is conventionally employed by those skilled in the art of fiberboard manufacture, namely to include not only true urea-formaldehyde resins but also similar resins in which part or all of the formaldehyde is replaced by other aldehydes, for example acetaldehyde, propionaldehyde or furfural, and/or in which part (typically 5-50% by weight) of the urea is replaced by melamine.)

Two different techniques have been used commercially for incorporating the resin into the fiber. In the first technique, the fibers are dried, stored in an intermediate storage bin and then metered to high speed centrifugal-type blenders. Within these blenders, intake shovels transport the dry fibers into a blending zone, where pointed, rotating mixing tools form and maintain a fluffy ring of fibers within the shell of the blenders. The blender is provided with a central shaft equipped with short, perforated nozzles; the resin is pumped through this shaft and dispersed by centrifugal force from the shaft onto the ring of fibers. The resin-treated fibers leave the blender still in a fluffy condition and the process produces a satisfactory distribution of resin. In this resin incorporation technique, the mechanical blending which has to be effected may cause surface spotting on the fiberboard sufficient to cause rejection of at least some of the fiberboard produced. Fiber stored after blending but before being formed into fiberboard tends to agglomerate and this agglomeration causes a build-up of resin in the pipes through which the blended fiber is carried to the forming station. In extreme cases, this build-up of resin in the pipes may actually cause plugging of the pipes, thus disrupting production. However, normally the resin build-up does not cause plugging of the pipe because the resin layer breaks away in pieces from the walls of the pipes and is thus carried in particulate form into the mat of fiber used to form the fiberboard. The particles of resin appear as dark spots on the surface of the fiberboard and excessive spotting may cause the fiberboard to be rejected.

The other technique commercially used for adding the resin to the fiber is so-called blow-line blending. In blow-line blending, the wood fibers produced in the attrition mill are ejected therefrom under steam pressure into a blow-line. Resin is injected through nozzles into the blow-line downstream from the attrition mill so that the resin contacts the fiber while it is still damp from the attrition mill and before it is subjected to drying. Blow-line blending of resin tends to produce very uniform distribution of resin throughout the fiber. Furthermore, the resin-coated fiber loses its tackiness during the drying stage. Blow-line blending thus tends to eliminate the resin spots associated with fiberboard produced from fibers treated with resin in centrifugal type blenders.

In blow-line blending, pre-cure of the resin has been a problem. Attempts have been made to overcome this problem by adding a retarding agent (a buffer or other chemical able to control pH) *to the resin* before the resin is added to the fiber by blow-line blending in order that the resin will resist pre-curing caused by the high temperatures to which the resin-coated fiber is subjected in the blow-line and dryer. It has been found that the addition of retarding agents to the resin can prevent precuring of the resin, but the effects obtained with retarding agents are not very reliable, probably because the retarding agents themselves tend to break down at the high temperatures experienced during the drying process.

We have now discovered that the pre-curing of resin during drying experienced in blow-line blending processes appears to be due to reaction between acid present in the fibers themselves and the resin which forms a film on the surface of the fibers. Accordingly, we have determined that the pre-curing problem can be overcome, or at least substantially ameliorated, by raising the pH of the wood by treating it with an alkaline material prior to blending the wood with the resin in the blow-line.

SUMMARY OF THE INVENTION

The invention provides a process for forming a dried, resin-treated fiber furnish from a naturally-acidic fiber comprising adding to the fibers a quantity of alkaline material sufficient to neutralize at least part of the acid in the fibers, blow-line blending the fibers with a urea formaldehyde resin, and drying the resin-blended fibers to produce a dried, resin-treated fiber furnish.

In saying that, in the instant process, the fibers are treated with an alkaline material, we do not necessarily imply that the fibers are separated from one another before the alkaline material is added. For example, as well be described in more detail below, in some embodiments of the invention the alkaline material may be added while the fibers are still in the form of wood chips.

BRIEF DESCRIPTION OF THE DRAWING

The accompanying drawing is a schematic diagram of an apparatus for carrying out the instant process.

DETAILED DESCRIPTION OF THE INVENTION

Figure 1:
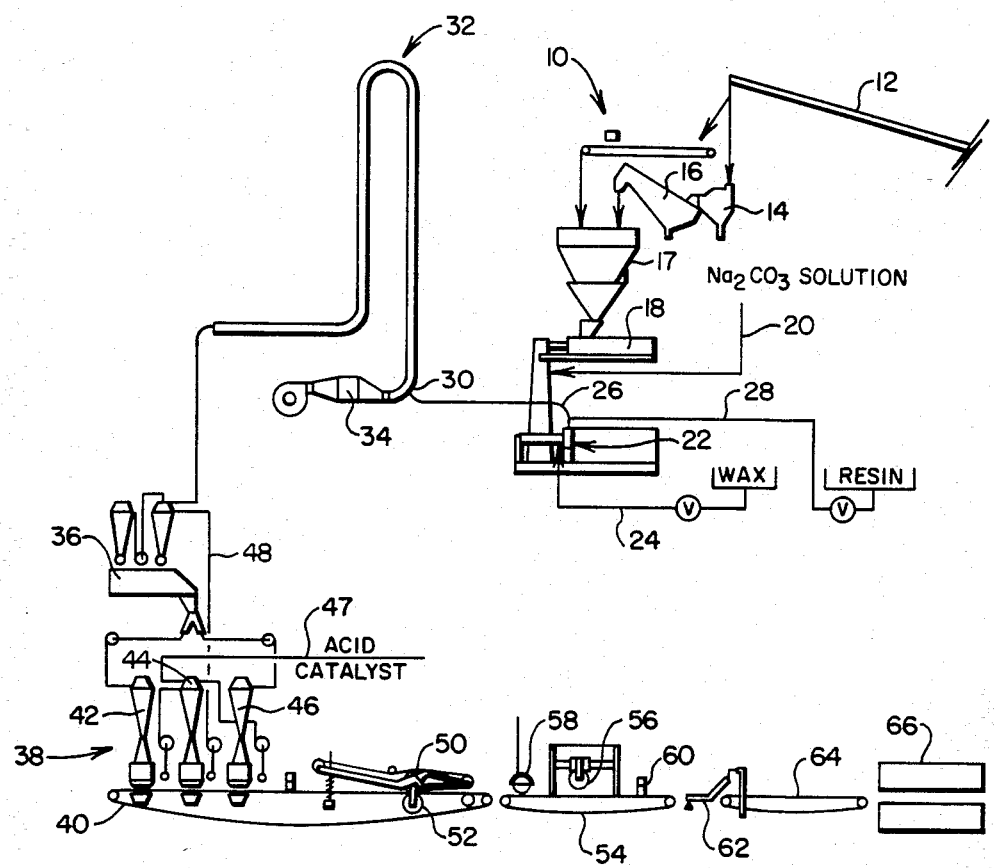

As already mentioned, in the instant process naturally-acidic fibers are treated with a quantity of alkaline material sufficient to neutralize at least part of the acid in the fibers. Preferably, the quantity of alkaline material used is sufficient to raise the pH of the fibers to the range of about 4 to about 7 and preferably about 5.0 to about 6.5. Our experiments to date indicate that the optimum pH is about 5.5, although this may of course vary somewhat with the exact nature of the fibers and the resin employed, and the temperature at which the drying is effected, because the higher the drying temperature the greater the tendency for the resin to pre-cure. A convenient and cheap alkaline material for use in the instant process is sodium carbonate though other alkaline materials, for example triethanolamine, alkali metal hydroxides, ammonium hydroxide or hexamine, may be used if desired. The fibers neutralized in the instant process are preferably wood fibers.

In commercial practice the formation of a furnish of wood fibers is normally achieved by a two-step process comprising a pre-heating step followed by an attrition or refining step. In the pre-heating step, wood chips are heated in contact with steam in order to soften the chips, usually under a pressure of about 0.6 to 1.0 MPa, in order to raise the temperature and hence accelerate the pre-heating process. Following the pre-heating step, the wood chips are passed to the attrition step where they are subjected to mechanical attrition sufficient to cause the chips to disintegrate into fibers, thereby forming the necessary furnish. This mechanical attrition is usually provided by forcing the wood chips into a narrow gap between a pair of parallel discs, one of which rotates at high speed relative to the other, thereby producing shear forces which effect disintegration of the wood chips into fibers. Although the instant process could if desired be practiced by adding the alkaline material in the attrition step, preferably between the discs, it is preferred that the alkaline material be added during the pre-heating step by using an aqueous alkaline solution that penetrates into the wood chips during the pre-heating step. Conveniently, the chips are immersed in the aqueous alkaline solution as they enter the pre-heating step. Although the exact amount of the preferred alkaline material, sodium carbonate, which must be added to the pre-heating step may vary somewhat depending upon the exact wood or mixture of woods used, since the amount of acid in natural woods varies over a wide range, in general it has been found that using approximately 0.5% by weight of sodium carbonate based upon the dry weight of the wood produces a pH close to the optimum pH of 5.5.

It is often desirable to include wax in the fiberboard in order to improve the resistance to absorption of water of the fibers and the finished fiberboard. If wax is to be incorporated in the fiberboard produced by the instant process, the wax should be added, preferably in liquid form, during the attrition step of the fiber preparation. Alternatively, the wax may be added to the chips prior to the pre-heating step.

The types of urea-formaldehyde resin used in the instant process are generally similar to those used in prior art blow-line blending processes. As already mentioned, the resin used may contain aldehydes other than formaldehyde and may contain melamine. The resin may also contain other additives which are known to be useful in blow-line blending, for example starch, glycol or sucrose to maintain resin solubility and flow and prevent excessive penetration of resin into the wet fiber during blending. The resin is normally applied in the form of a solution containing 40–65% by weight solids, although the solids content does not appear to be especially critical. To ensure proper blending of the resin with the fiber stream, the viscosity of the resin solution should not be too great, the upper limit on resin solution viscosity for proper operation being around 250 cp. Optimum results are achieved using resins having formaldehyde:urea ratios of about 1.0:1 to 1.8:1, the optimum mole ratio being about 1.6:1. The tack of the resin solution is not critical in blow-line blending processes, but resin reactivity is. The amount of resin used will generally be from about 4 to about 25% of the dry weight of the fiber, the optimum amount usually being about 9 to about 10% of the dry weight of the fiber. The optimum amount of resin needed in blow-line blending processes is sometimes somewhat greater than that needed in centrifugal blending processes. The resin is preferably adjusted to about pH 7.0–8.5 before blending with the wet fiber and the fiber should not be too hot during blending in order to prevent pre-curing of the resin; application of the resin to fiber having a temperature of about 110° C. gives good results.

In the instant process, as in other blow-line blending processes, the conditions used for drying the fiber following addition of resin thereto are critical since excessively high drying temperatures or times may cause pre-curing of the resin, even though the pH of the fiber has been adjusted by means of the instant process. It is preferred to dry the fiber by entraining the stream of fiber from the blow-line blender in a stream of hot gas, which is conveniently produced by a gas or oil burner or by indirect heating with steam or thermo-oil. This hot gas drying technique allows flash drying of the fiber, thereby preventing lengthy exposure of the resin-treated fiber to elevated temperatures. Generally speaking, the temperature at the inlet of the dryer (i.e. the point at which the fiber stream is first contacted with the hot gas) should not exceed about 200° C., while the temperature at the outlet from the dryer should not exceed about 80° C. Optimum dryer temperatures tend to be somewhat lower, being around 160° C. inlet temperature and 60° to 70° C. outlet temperature. Because of rapid evaporation of water from the fiber in the dryer, the actual temperature of the fiber in the dryer is considerably less than the dryer air temperature, though the temperature of the fiber at the dryer outlet is close to the measured dryer outlet temperature.

In saying that the drying step of the instant process produces a dry, resin-coated fiber we of course do not mean that the resin-treated furnish produced by the drying step is completely anhydrous, only that it contains no water on the surface of the fibers. In fact, the optimum moisture content in the resin-treated furnish leaving the drying step of the instant process is about 10 to 15% by weight.

As already mentioned, the main use for the dried, resin-treated fiber furnish produced by the instant process is in the manufacture of fiberboard, especially medium density fiberboard, although the furnish may also be used for other purposes such as forming dry process hardboard. When the instant furnish is to be used for forming fiberboard, the dried, resin-treated fiber furnish leaving the drier is desirably stored in an intermediate storage bin. Such as bin provides a reservoir of furnish ready for forming into fiberboard and is thus useful if temporary interruptions of the blow-line blending process have to be made for any reason.

To form fiberboard from the instant furnish, the furnish is spread in a layer upon an appropriate surface to form a mat of furnish. In commercial practice, the furnish is normally deposited onto the horizontal surface of a conveyor screen by spreading devices designed to deposit a specific weight of fiber per unit length of the screen passing the spreading device. Because of the considerable thickness of the mat which must be formed (which in the case of the very fluffy furnish produced by a blow-line blending process is typically about 20 times the final thickness of the fiberboard to be produced), it is normally necessary to employ several successive spreading devices in order to form, in a closely controlled manner, a mat of the desired thickness. Furthermore, because the hot pressing used to form the final fiberboard causes more rapid cure of the surface layers of the mats than of the core layer if the mat is formed of the same furnish throughout, it is desirable to form the mat so that the surface layers are formed of a furnish which will cure more slowly than the fiber used for the core layer. The instant invention provides a simple manner of varying the properties of the surface of the core layers in the desirable manner. It will be appreciated that the alkaline material added to the fibers in the instant process carrier through into the furnish used to form the mat and hence retards the curing of the resin during hot pressing. Furthermore, although it is very desirable that the surface layers of furnish be treated by the instant method with alkaline material in order to reduce precure and for the reasons already explained, for the reasons already explained above it is less important that the furnish used to form the core layer have been treated with alkaline material, since it is not particularly important to avoid resin spots in the core layer; obviously, such resin spots in the core layer do not detract from the appearance of the fiberboard and resin spots in the core layer do not significantly effect the physical properties of the fiberboard. Accordingly, in practicing the instant process it is convenient to form the mat with surface layers of furnish which have been treated with alkaline material but with a core layer which need not have been so treated. If the apparatus being used incorporates two separate sets of apparatus for forming separate surface and core furnishes, the surface furnish can have alkaline material added thereto while the core furnish need not have alkaline material added thereto, and indeed need not be blow-line blended—some commercial plants use a core furnish produced by mechanically blending fiber with resin. The mat is then formed with two surface layers of the surface furnish and a core formed from the core furnish. Alternatively, if the plant being employed only has a single set of apparatus for producing the furnish, the furnish may be divided into first and second portions after it has left the dryer and an acidic catalyst for accelerating the setting of the resin added to the second portion of the resin-coated fiber. The mat is then formed with two surface layers of the first portion of the resin-coated fiber which has not been acid catalyzed, but with a core layer of the second portion of the resin-coated fiber which has been acid catalyzed. The acidic catalyst used may be a water-soluble acid or acidic salt having a $pK_a$ value less than about 5.5 and desirably less than 5, for example ammonium sulfate, or a buffered catalyst.

When part or all of the furnish to be used in the instant process for forming fiberboard requires the addition of an acidic catalyst, various techniques may be employed for adding the acidic catalyst to the furnish. For example, the acidic catalyst may be mechanically blended with the furnish in a conventional mechanical blender. Alternatively, the acidic catalyst may be sprayed onto the furnish, preferably as the furnish is being supplied to the forming heads which deposit a layer of furnish on the surface. It should be noted that, if the instant process is to be used in a plant which employs only a single blow-line and a single dryer and in which mats are stacked to produce the final mat which is then hot-pressed, it will normally be necessary to add an acidic catalyst to the whole mat in order to overcome the retarding effect of the alkaline material on the rate of cure of the resin during hot-pressing. When adding acidic catalysts, care should be taken that the furnish has had a chance to cool after drying to a relatively low temperature, such as 20°-30° C., in order to avoid pre-curing of the resin. The wetting of the furnish with the acidic catalyst is believed to aid in flow and improve the molecular transfer of resin to adjacent fibers during the hot-press operation. Introduction of the catalyst also assures a more complete cure in the core of homogeneous board in a plant which stacks mats.

In saying that, the preferred variant of the instant process, the mat is laid down with a core layer sandwiched between two surface layers, we do not of course exclude the possibility that any one of these three layers may itself actually be laid down in the mat-forming process as a composite of several individual layers. In practice, since each of the surface layers may only comprise 10-15% of the thickness of the mat, it will usually be convenient to lay down each of the surface layers in a single operation, whereas it will often be desirable to lay down the core layer, which comprises the greater part of the thickness of the mat, as a composite of several individual layers.

After the mat has been formed, it may if desired be subjected to the action of a scalper to reduce it to a uniform thickness. With or without such scalping the final step in the instant process is hot pressing the mat of resin-coated fiber to form the fiberboard. However, it is desirable that, before the mat is hot pressed, it be subjected to pre-compression in order to reduce its thickness. As already mentioned, the thickness of the mat is usually about 20 times the thickness of the final fiberboard and it is very difficult to arrange for hot pressing of such a thick mat using commercially-available presses. Pre-compression of the mat, which is usually effected without the application of heat, normally by means of a spring-loaded roller bearing down upon the belt carrying the mat and a fixed support roller positioned below the belt, serves to reduce the mat to typically one-fourth of its original thickness, i.e. about 5 times the final thickness of the fiberboard, a thickness which can reasonably be accommodated in commercially-available hot presses. Since commercial mat-forming and pre-compression apparatus operates on a continuous basis, whereas commercial hot pressing operates discontinuously on discrete pieces of fiberboard, following pre-compression the mat is normally cut into pieces having the same length and width as the final sheets of fiberboard to be produced. If mat stacking is to be effected, it is normally done after the pre-compression. Also, at this stage, it is usually desirable to weigh the individual pieces of the mat in order to ensure that they have the proper weight.

Hot pressing of fiberboard is normally effected in a press using directly-heated platens. Especially when producing thick boards, it is sometimes advantageous to employ radio-frequency (RF) heating of the board in the press in order to produce a greater uniformity of heating through the thickness of the board. As already mentioned, direct contact of the hot platens with the surface layers of the board produces more rapid curing of the surface layers than of the core (even when RF heating is employed), so it is desirable that these surface layers of the board have a resin which is less reactive than the resin in the core layer. Careful control of press temperature, closing speed and pressure is necessary to produce high quality fiberboard. Press temperatures are generally in the range of about 140°–180° C.; although the specific examples of the instant process given below use a temperature of 170° C., we consider that a slightly lower press temperature of about 150° C. might yield slightly better results. The specific pressures employed are usually in a range below 3.5 MPa, and the duration of the pressing cycle should be around 20 seconds per millimeter of board thickness, e.g. four minutes for a 12 millimeter board. As is conventional in the art, it is generally desirable to use cauls on either side of the board in the press in order to improve the surface texture of the board.

Too slow closing of the press increases the depth of pre-curing of the surface layers to an undesirable extent, while too rapid a press closing tends to produce a board having relatively high-densities in the surface layers but a low-density, weak core. Accordingly, the preferred press-closing technique involves closing of the press to an intermediate position, in which the gap between the platens is still substantially wider than in the final board, and holding in this position until the core of the board has heated up. Once the core has thus heated, the press is then closed to the final thickness. This "intermittent hold" technique tends to produce a board having a relatively constant density throughout its thickness.

One important advantage of the instant process, besides the elimination of surface spots in the fiberboard, is that the absence of pre-cure of the resin in the surface layers produces a very good, uniform surface on the fiberboard. Normally, when manufacturing fiberboard it is necessary to sand off the surface layers after pressing to remove irregularities caused by pre-curing of the resin in the surface layers. The improved surface produced by the instant process eliminates or at least substantially reduces the need for sanding of the surface, thereby greatly reducing the sanding tolerance required and effecting substantial savings in raw material and costs associated with the sanding step. We estimate that, on a 12 millimeter board, the reduction in costs due to reduction of raw material and costs associated with sanding may amount to about 10% of the total cost of the fiberboard produced by prior art blow-line blending techniques.

As already stated, the accompanying drawing shows schematically an apparatus for carrying out the instant process. This apparatus, generally designated 10, comprises an elevator 12, by means of which wood chips are carried from a stockpile (not shown) to a chip washing apparatus 14. The wood chips may be any of a variety of woods, for example birch, chestnut, poplar, spruce, pine, fir, hemlock, beech, ash, kimba, gaboon, linden or eucalyptus. As those skilled in the art are aware, appropriate size chips may be prepared by wood chipping apparatus from whole trees or from such materials as peeler cores, veneer residues, slabs, edgings or the like. Various other forms of wood waste, for example planar shavings and sawdust from wood-working industries may also be used and the feed material may also include non-woody cellulosic materials such as bagasse, flax, straw, bamboo, sisal or cotton.

In the chip washing apparatus 14, the chips are washed to remove dirt and other impurities therefrom. The washed chips are not conveyed by an Archimedean screw conveyor 16 to a hopper 17 and thence by a screw feeder 18 to a pre-heater 19, where they are heated with steam at a pressure of 0.6 to 1.0 MPa in order to soften the chips. In accordance with the instant invention, there is added to the pre-heater 19 an aqueous solution of sodium carbonate supplied via a feed line 20. The quantity of sodium carbonate added to the preheater is sufficient to raise the pH of the fiber produced to the range of about 5.0 to about 6.5, and preferably about 5.5; to secure the optimum pH the quantity of sodium carbonate necessary to usually about ½% by weight of the wood chips entering the pre-heater, and this is conveniently effected by adding 10% by weight of the wood chips of a 5% aqueous solution of sodium carbonate via the feed line 20.

Following treatment in the pre-heater 19, the chips and accompanying alkaline solution pass to an attrition mill 22 which may be, for example, an L 42 Defibrator (manufactured by Sunds Defibrator AB, S 102-51 Stockholm, Sweden). The mill 22 subjects the chips to mechanical attrition between a pair of closely spaced discs rotating rapidly relative to one another, thereby causing the chips to disintegrate into fibers and form a mass of wood fibers. If desired, paraffin wax in molten form may be injected into the attrition mill 22 via a wax feed line 24. The attrition mill 22 is steam heated and the contents thereof are under pressure.

The steam pressure within the mill 22 forces a stream of damp fibers through a blow line 26. Blending of a urea-formaldehyde resin with the damp fiber leaving the mill 22 is accomplished in the blow line 26 by feeding the urea-formaldehyde resin in the form of a liquid solution into the blow line via a resin feed line 28. The quantity of urea-formaldehyde resin thus blended with the fiber is usually from about 4 to about 25% by weight of the dry weight of the fiber passing through the blow line, the optimum amount of resin solids normally being about 10% of the dry weight of the fibers.

The blow line 26 extends from the mill 22 to the inlet 30 of a flash dryer 32. In normal operation, the temperature in the blow line 26 varies from about 120° C. immediately adjacent the refiner 22 to about 100° C. at the dryer entrance 30, being around 110° C. at the point where the resin feedline 28 intersects the blow line. The fiber travels along the blow line at a high velocity, typically 80–150 meters per second, so that the dwell time in the blow line is only about 0.2 seconds. Only about 0.2% of the volume of the blow line 26 is occupied by fiber at any time.

At the dryer entrance 30, the damp fiber leaving the blow line 26 is brought into contact with a stream of hot gas provided by a natural gas or oil burner 34 (other sources of hot gas, e.g. by indirect heating, may be used if desired). The hot gas from the burner 34 enters the dryer 32 at a temperature of about 160° C., entraining the fiber entering the dryer from the blow line 26 and causing flash drying of the fiber to produce a dry, resin-coated fiber as the mixture of hot gas and fiber passes through the dryer 32, which has substantially the form of an inverted U. The dwell time in the dryer is approximately 3 to 4 seconds and the outlet temperature of the dryer 50°–80° C. It should be noted that although the inlet temperature of the dryer is approximately 160° C., flash evaporation of water from the fiber limits the actual temperature of the fiber to somewhat less than 100° C.

From the dryer 32, the resin-coated fiber or furnish passes to intermediate storage bins 36. From the intermediate storage bins 36, the resin-coated fiber is metered to a forming line assembly 38, which comprises a belt conveyor 40, preferably made of a plastic mesh screen, having disposed thereabove three forming heads which evenly distribute controlled quantities of fiber onto each unit length of the belt passing thereunder. The first forming head 42 deposits a base layer of resin-coated fiber on the belt 40, a second forming head 44 deposits a core layer of resin-coated fiber on top of the base layer, and a third forming head 46 deposits a top layer of resin-coated fiber on top of the core layer, thereby producing a mat of resin-coated fiber. For the reasons mentioned above, the forming head 44 which deposits the core layer is provided with an acid catalyst supply line 47 through which acid catalyst can be mixed with the core layer of fiber in order to accelerate the curing of the resin in this core layer. (It will be appreciated that the illustration of three forming heads is only schematic, and in practice the core layer may be deposited by several successive forming heads.) A line 48 returns excess furnish from the forming heads 42, 44 and 46 to the bin 36.

The mat formed by the forming line 38 is carried by the belt conveyor 40 through a pre-compression apparatus comprising a loaded roller 50 disposed above the mat and a fixed roller 52 disclosed below the mat. This pre-compression apparatus serves to compress the mat to about ¼ of its original thickness.

After passing the pre-compression apparatus, the mat leaves the belt 40 and is passed to a second belt conveyor 54 above which is disposed a cutting apparatus comprising trimming saws 56, which trim the edges of the mat to the appropriate width for pressing and a transverse saw 58 which cuts the mat into lengths appropriate for pressing. After trimming and cutting to length, the cut sections of mat pass a metal detector 60 coupled to mat ejecting apparatus (not shown) which is arranged so that any sections of mat into which metal has accidentally entered are automatically rejected, in order to avoid damage to the press during the hot pressing operation. After passing the metal detector 60, the sections of mat are weighed on a scale 62, to check that they are within the appropriate weight limits to produce the fiberboard of the desired density and the sections of mat are then conveyed by a third belt conveyor 64 to a press 66 where they are pressed between hot platens to form the final fiberboard.

EXAMPLES

Except for the control Examples 1 and 5–7, test samples of fiberboard were produced by the instant process using an apparatus as described above with reference to the accompanying drawing except that it lacked the line 47. The wood used was spruce chips. No wax was added to the preheater. The urea-formaldehyde resin used had a formaldehyde:urea ratio of 1.35:1 and was added to the fiber in an amount of 10 parts by weight of dry resin solids per 100 parts by weight of dry wood. Drying was effected using a dryer inlet temperature of 60°–80° C. and an outlet temperature averaging about 40° C., the dwell time in the dryer being about 10 seconds. However, for test purposes instead of being passed to the intermediate storage bins, the dry, resin-coated fiber leaving the dryer was caught in large plastic bags. 2.8 Kg. of the dry, resin-coated fiber thus collected was air-formed into a mat and, pre-compressed. The pre-compressed mat was then trimmed to 36×43 cm. and weighed. Hot pressing was then effected at a platen temperature of 170° C. with a press set to 14 mm. stops using top and bottom stainless steel cauls 1 mm. thick to produce a 12 mm. thick (nominal) fiberboard. In Examples 1–7 the platens were closed at a constant gauge pressure of 8.7 MPa, except for the experiments where the press closing time exceeded about 25 seconds, where a gauge pressure of 4.0 MPa was used, while in Examples 8–10 an automatically-controlled position control pressing technique was employed in which the press was partially closed, left until the core had warmed up and then the press was closed completely. The duration of the pressing time was either 4 or 5 minutes as indicated in Table 1 below. In some of the tests, curing of the resin during hot pressing was accelerated by adding a commercially-available acidic catalyst known as UXO-26. This catalyst was incorporated into the blow-line blended resin-treated fiber by mechanical blending except in Example 2 where the catalyst was added to the resin prior to blow-line blending; in all cases where the catalyst was used, it was added to the whole of the fiber used to form the board.

The panels formed were conditioned for at least three days before testing, then tested for internal bond strength (IB), modulus of rupture (MOR) water absorption and swelling by American Society for Testing and Materials Standard D1037-72a. Table 1 below gives details of the pressing techniques employed and the moisture content, thickness and weight of the boards after the hot pressing, while Table 2 below gives the results of the test conducted to determine the physical property of the panels produced.

Details of the process used in the Examples were as follows:

EXAMPLE 1 (CONTROL)

The fibers were not treated with sodium carbonate, so that this process was a conventional prior art process. The pH of the untreated wood was 4.0.

EXAMPLE 2

The wood was treated in the digester with approximately 1% of the weight of dry wood of sodium carbonate, thereby raising the pH of the fibers to 6.2. 2% of the weight of resin solids of the catalyst was added to the resin prior to the blow-line blending.

EXAMPLE 3

The conditions used were the same as in Example 2 except that a slightly different catalyst was mechanically blended with the resin-treated fiber.

EXAMPLE 4

The conditions used were the same as in Example 3 except that the catalyst employed was exactly the same as in Example 2.

EXAMPLE 5 (CONTROL)

The fibers were treated with sodium carbonate as in Example 2, then *mechanically blended* with the resin. No catalyst was employed. Mechanical blending produces a board which suffers from surface spotting but which has a hard, glassy surface, and Examples 5-7 were designed to produce a hard surface for comparison with the surfaces of the boards of the invention.

EXAMPLE 6 (CONTROL)

The conditions used were the same as in Example 5 except that an acid catalyst was added in the same manner as in Example 4.

EXAMPLE 7 (CONTROL)

The conditions used were the same as in Example 5.

EXAMPLE 8 (CONTROL)

The conditions used were the same as in Example 1 except that the automatically controlled pressing technique was employed.

EXAMPLE 9

The conditions used were the same as in Example 8 except that the wood was treated in the digestor with sufficient sodium carbonate to raise its pH to 4.6.

EXAMPLE 10

The conditions used were the same as in Example 9 except that the pH of the wood was raised to 5.4.

The board produced in Example 1 had a very loose, friable surface which would need sanding off before the board could be used. The board of Example 2 had a better, though still rather soft surface, while the boards produced in Example 3 and 4 had much harder, glossier surfaces. The boards of Examples 2-4 were free from resin spots, but their physical properties were probably adversely affected by the press closing technique employed. The boards of Examples 9 and 10 were not only free from surface resin spots, but their physical properties were considerably superior to those of the board produced by the comparable prior art process, Example 8.

As already mentioned, in the above Examples (except for Example 8) the acidic catalyst (when used) was separately mechanically blended with the furnish. This use of mechanical blending was, however, merely an experimental technique employed because the apparatus used lacked the catalyst supply line 47. Later preliminary experiments using a different apparatus in which an acidic catalyst was fed into the line 48 indicated that this catalyst supply technique produced substantial increase in the IB and surface strengths of the boards produced.

It will be apparent to those skilled in the art that numerous changes and modifications can be made in the preferred embodiments of the invention described above without departing from the scope of the invention. Accordingly, the foregoing description is to be construed in an illustrative and not in a limitative sense,

TABLE 1

| Example No. | Thickness after forming mm | Thickness after pre-compression mm. | Moisture Content before hot Pressing % | Pre-pressed Mat Specific Gravity | Press Closing Time to stops sec. | Press Time Secs. | Board Specific Gravity |
|---|---|---|---|---|---|---|---|
| 1(Control) | 390 | 95 | 8 | 0.091 | 120 | 240 | 0.701 |
| 2 | 400 | 100 | 11.5 | 0.087 | 100 | 300 | 0.725 |
| 3 | 340 | 60 | 13 | 0.143 | 10 | 240 | 0.693 |
| 4 | 330 | 50 | 14 | 0.169 | 12 | 240 | 0.679 |
| 5(Control) | 350 | 50 | 11 | 0.131 | 13 | 240 | 0.635 |
| 6(C0ntrol) | 350 | 60 | 11 | 0.132 | 14 | 240 | 0.646 |
| 7(Control) | 360 | 65 | 11 | 0.128 | 60 | 300 | 0.685 |
| 8(Control) | 210 | 65 | 11.8 | 0.128 | 100 | 240 | 0.685 |
| 9 | 220 | 60 | 11.8 | 0.150 | 100 | 240 | 0.740 |
| 10 | 210 | 65 | 12 | 0.139 | 100 | 240 | 0.729 |

TABLE 2

| Example # | 1 (Control) | 2 | 3 | 4 | 5 (Control) | 6 (Control) | 7 (Control) | 8 (Control) | 9 | 10 |
|---|---|---|---|---|---|---|---|---|---|---|
| Thickness (sanded) mm | 11.2 | 10.5 | 10.5 | 10.5 | 10.5 | 10.5 | 10.3 | 10.4 | 10.4 | 10.3 |
| Specific Gravity (MOR Test Pieces) | 0.751 | 0.758 | 0.706 | 0.695 | 0.655 | 0.662 | 0.697 | 0.678 | 0.746 | 0.693 |
| Bending (IB Test Pieces) MPa | 26.7 | 24.1 | 24.8 | 33.6 | 29.1 | 31.1 | 32.0 | 18.3 | 25.9 | 28.5 |
| Specific Gravity (IB Test Pieces) | 0.761 | 0.719 | 0.704 | 0.677 | 0.602 | 0.636 | 0.709 | 0.668 | 0.737 | 0.724 |
| Internal Bond Strength kPa | 460 | 472 | 301 | 149 | 129 | 141 | 204 | 364 | 683 | 528 |
| Water absorption % | 86.3 | 114.0 | 115.1 | 102.3 | 126.1 | 123.5 | 105.2 | 85.9 | 63.4 | 86.3 |
| Swelling % | 30.0 | 42.0 | 37.4 | 28.8 | 35.2 | 33.0 | 33.2 | 24.2 | 18.4 | 29.1 |
| Correction to specific gravity 0.700 | | | | | | | | | | |
| Bending strength | 22.1 | 19.4 | 24.2 | 34.2 | 34.8 | 36.1 | 32.4 | 19.95 | 21.8 | 29.3 |
| Internal bond strength | 358 | 436 | 296 | 165 | 203 | 188 | 196 | 419 | 585 | 477 | the scope of the invention being defined solely by the appended claims.

We claim:

1. A process for forming a dried, resin-treated fiber furnish from a naturally-acidic fiber comprising:
adding to said fibers not more than about 1% of the dry weight of said fibers of an alkaline material thereby neutralizing at least part of the acid in said fibers, and raising the pH of said fibers into the range of about 4 to about 7;
blow-line blending said fibers with a urea-formaldehyde resin; and
drying said resin-blended fibers to produce a dried, resin-treated fiber furnish, said drying being effected at a temperature sufficiently low that curing of said resin does not occur during said drying.

2. A process according to claim 1 wherein said quantity of alkaline material is sufficient to raise the pH of said fibers to the range of about 5.0 to about 6.5.

3. A process according to claim 2 wherein said quantity of alkaline material is sufficient to raise the pH of said fibers to about 5.5.

4. A process according to claim 1 wherein said fibers comprise wood fibers.

5. A process according to claim 1 wherein said alkaline material is sodium carbonate.

6. A process according to claim 1 wherein said addition of said alkaline material is effected by immersing said fibers in a liquid solution of said alkaline material.

7. A process according to claim 4 wherein wood chips coated with an aqueous solution of said alkaline material are with treated with steam and thereafter subjected to mechanical attrition sufficient to cause said chips to disintegrate into fibers prior to said blow-line blending.

8. A process according to claim 7 wherein said alkaline material is added to said wood chips in the preheater of the attrition mill used to effect said mechanical attrition.

9. A process according to claim 7 wherein said mechanical attrition is effected using an attrition mill having at least one pair of rotating discs and wherein said alkaline material is introduced between said discs of said attrition mill.

10. A process according to claim 7 wherein wax is added to said chips during said mechanical attrition.

11. A process according to claim 1 wherein said resin has a formaldehyde:urea mole ratio of from about 1.0:1 to about 1.8:1.

12. A process according to claim 1 for producing fiberboard wherein a layer of said resin-treated furnish is formed into a mat of said furnish and said mat is hot pressed to form said fiberboard.

13. A process according to claim 12 wherein an acidic catalyst for accelerating the setting of said resin is added to at least part of said resin-treated furnish used to form said mat, said addition of said acid catalyst being effected at a temperature sufficiently low to prevent curing of said resin prior to said hot pressing.

14. A process according to claim 13 wherein said acidic catalyst is added to all said resin-treated furnish used to form said mat.

15. A process according to claim 13 wherein said resin-treated furnish is divided into first and second portions and said acidic catalyst is added to said second portion but not to said first portion, and wherein a base layer of said first portion is formed, a core layer of said second portion is spread on top of said base layer, and a top layer of said first portion is spread on top of said core layer, thereby producing a mat having an acid-catalyzed core sandwiched between two surface layers which are not acid-catalyzed.

16. A process according to claim 12 wherein said hot pressing is effected such that no part of the mat is exposed to a temperature in excess of about 170° C.

17. A process according to claim 12 wherein a first surface layer of said resin-treated fiber furnish is spread on said surface, a core layer of resin-treated furnish is spread on said first surface layer and a second surface layer of said resin-treated fiber furnish is spread on said core layer.

18. A process according to claim 17 wherein said core layer is formed from a furnish prepared by mechanically blending fiber with a resin.

19. A process according to claim 4 wherein said fibers are derived from any one or more of birch, chestnut, poplar, spruce, pine, fir, hemlock, beech, ash, kimba, gaboon, linder and eucalyptus trees.

* * * * *

UNITED STATES PATENT AND TRADEMARK OFFICE
CERTIFICATE OF CORRECTION

PATENT NO. : 4,514,255

DATED : April 30, 1985

INVENTOR(S) : John W. Maxwell, et al.

It is certified that error appears in the above-identified patent and that said Letters Patent is hereby corrected as shown below:

Column 2, line 61 should read:
--- as will be described in more detail below ---.

Column 4, line 68 should read:
--- Such a bin provides a reservoir ... ---.

Column 8, line 11 should read:
--- The washed chips are next conveyed... ---.

Column 9, line 10 should read:
--- From the dryer 32, the dry resin-coated fiber... ---.

UNITED STATES PATENT AND TRADEMARK OFFICE
CERTIFICATE OF CORRECTION

PATENT NO. : 4,514,255
DATED : April 30, 1985
INVENTOR(S) : John W. Maxwell, et al.

It is certified that error appears in the above-identified patent and that said Letters Patent is hereby corrected as shown below:

Column 8, line 13 should read:
--- to a pre-heater where ---.

Column 8, line 16 should read:
--- to the pre-heater an aqueous ---.

Column 8, line 27 should read:
--- Following treatment in the pre-heater, the ---

Column 13, line 33 (line 3 of claim 7) should read:
--- are treated with steam and thereafter ---

Column 14, line 43 (line 4 of claim 19), should read:
--- gaboon, linden and eucalyptus trees ---.

Signed and Sealed this

Twenty-seventh Day of August 1985

[SEAL]

Attest:

DONALD J. QUIGG

Attesting Officer     Acting Commissioner of Patents and Trademarks